United States Patent [19]

Friday

[11] 3,863,053

[45] Jan. 28, 1975

[54] SLANT RANGE CORRECTION CIRCUIT

[75] Inventor: Robert E. Friday, Lenexa, Kans.

[73] Assignee: King Radio Corporation, Olathe, Kans.

[22] Filed: Aug. 27, 1973

[21] Appl. No.: 391,617

[52] U.S. Cl.......... 235/150.2, 235/150.22, 235/186, 235/191, 343/112 C
[51] Int. Cl.............................................. G06g 7/78
[58] Field of Search....... 235/150.2, 150.22, 150.26, 235/150.27, 186, 189, 191; 343/112 C, 112 D

[56] References Cited
UNITED STATES PATENTS

| | | | |
|---|---|---|---|
| 3,036,776 | 5/1962 | Schroeder | 235/191 |
| 3,058,661 | 10/1962 | Summers | 235/191 |
| 3,398,267 | 8/1968 | Hattendorf | 235/150.26 |
| 3,665,465 | 5/1972 | Miller | 235/150.22 X |
| 3,723,719 | 3/1973 | Chen et al. | 235/191 X |
| 3,740,004 | 6/1973 | Doniger et al. | 235/150.22 X |

Primary Examiner—Malcolm A. Morrison
Assistant Examiner—Jerry Smith
Attorney, Agent, or Firm—Lowe, Kokjer, Kircher, Wharton & Bowman

[57] ABSTRACT

Method and apparatus for determining horizontal distance of an aircraft from a ground VORTAC station. An analog circuit performs the trigonometric computation necessary to derive horizontal distance from the input parameters of aircraft height above the ground and DME slant range. Slant range information controls the variable damping of a wien bridge oscillator thereby generating a sinusoidal signal having a peak value directly proportional to DME slant range magnitude. This signal is processed by appropriate integrating circuitry thereby deriving a correction term, which, when substracted from the DME slant range input, yields aircraft-to-VORTAC horizontal distance.

11 Claims, 7 Drawing Figures

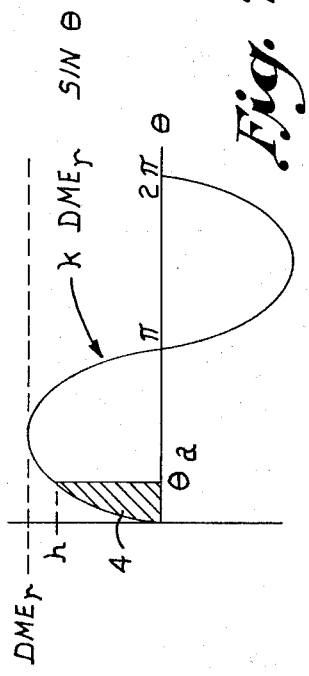
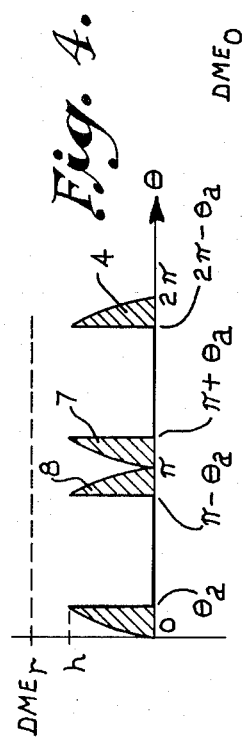
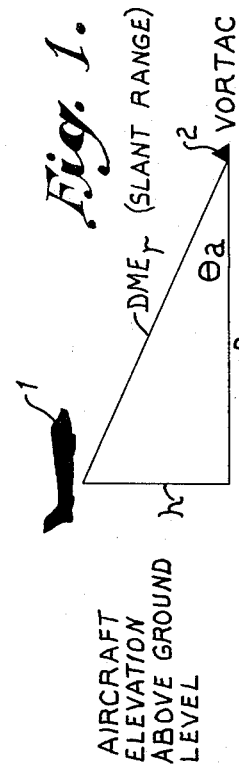
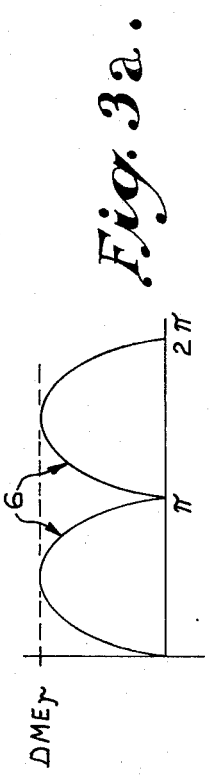
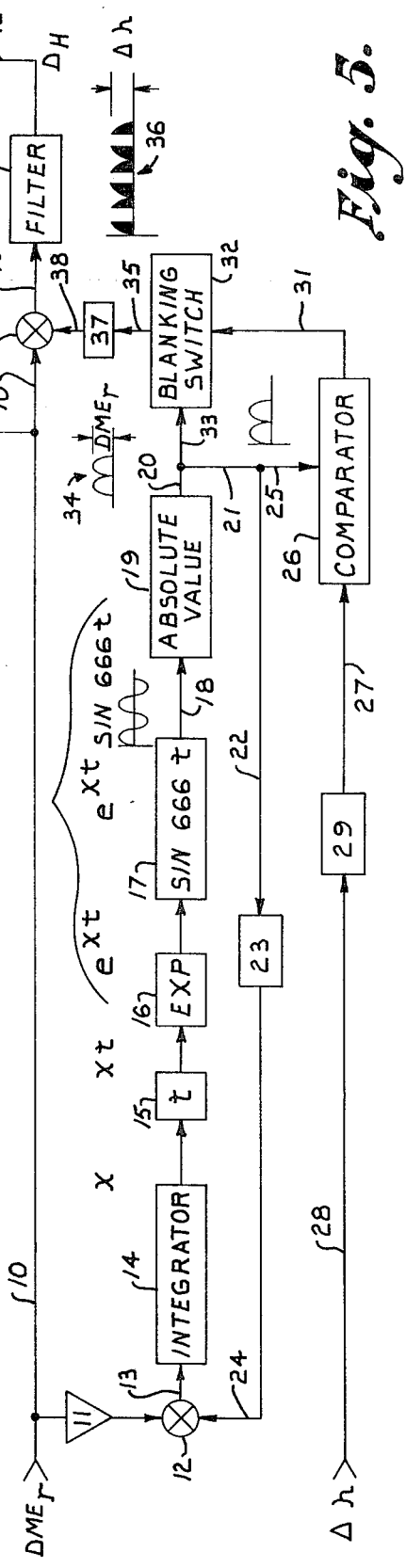

3,863,053

SLANT RANGE CORRECTION CIRCUIT

BACKGROUND AND BRIEF DESCRIPTION OF THE INVENTION

This invention relates to an avionics navigation system for the measurement of distance. More particularly the invention relates to the measurement of the horizontal distance between an aircraft and a navigational ground based VORTAC station.

Through the use of distance measuring equipment (DME), an aircraft can determine its exact distance from a ground VORTAC radio station. This distance is commonly referred to as "slant range," and it may be thought of as the hypotenuse of a right triangle in which aircraft elevation above the ground and horizontal aircraft-to-VORTAC distance form the other two sides. A trigonometric relationship is thus presented for solution.

It is a primary object of the subject invention to compute aircraft horizontal distance through analog solution of the trigonometric problem presented.

In the prior art a function generator or other approximation technique is utilized for determining the solution. For example, aircraft altitude and DME slant range may be inputted to a circuit which parameterizes them and then squares the result. The square root of the difference of the two resultant quantities yields the horizontal distance. This technique necessitates utilization of complex filters to handle the varying waveform bandwidths therein, and inevitably distortion results in this and similar processes.

It is another object of the subject invention to generate and use an actual sine wave to perform the aforementioned trigonometric solution rather than using an approximation or function generator. It is a feature of the invention that a wien bridge oscillator generates a sinusoidal output having a peak value directly proportional to the aircraft DME slant range. The oscillator damping ratio is controlled by feedback of an error signal, which insures the proper oscillator output amplitude. This output signal is then delivered to suitable waveshaping circuitry which performs the trigonometric computations necessary to the solution of the problem.

Another object of the invention is to provide a unique slant range correction circuit for use in avionics systems of the character described which obviates the need for complex filters and other expensive and difficult to fabricate electronic components.

A further object is to provide an avionics slant range correction circuit that is rugged, reliable, light weight, long lived and which may be manufactured at a considerably lower cost than the known prior art.

These and other objects of the invention, together with the features of novelty appurtenant thereto, will appear in the course of the following description.

DETAILED DESCRIPTION OF THE DRAWINGS

In the accompanying drawings which form a part of the specification and are to be read in conjunction therewith, and in which like reference numerals are employed to indicate like parts in the various views;

FIG. 1 graphically depicts the trigonometric relationship of the parameters involved in the computation performed by the subject invention;

FIG. 2 graphically depicts one cycle of a sine wave generated in the subject invention;

FIG. 3A graphically depicts the absolute value of the sine wave of FIG. 2;

FIG. 3B graphically depicts a square wave pulse signal which is related to the waveform of FIG. 3A;

FIG. 4 graphically depicts the results of comparing the waveform shown in FIG. 3A with that shown in FIG. 3B;

FIG. 5 is a block diagram of the subject invention; and

Figure 6:
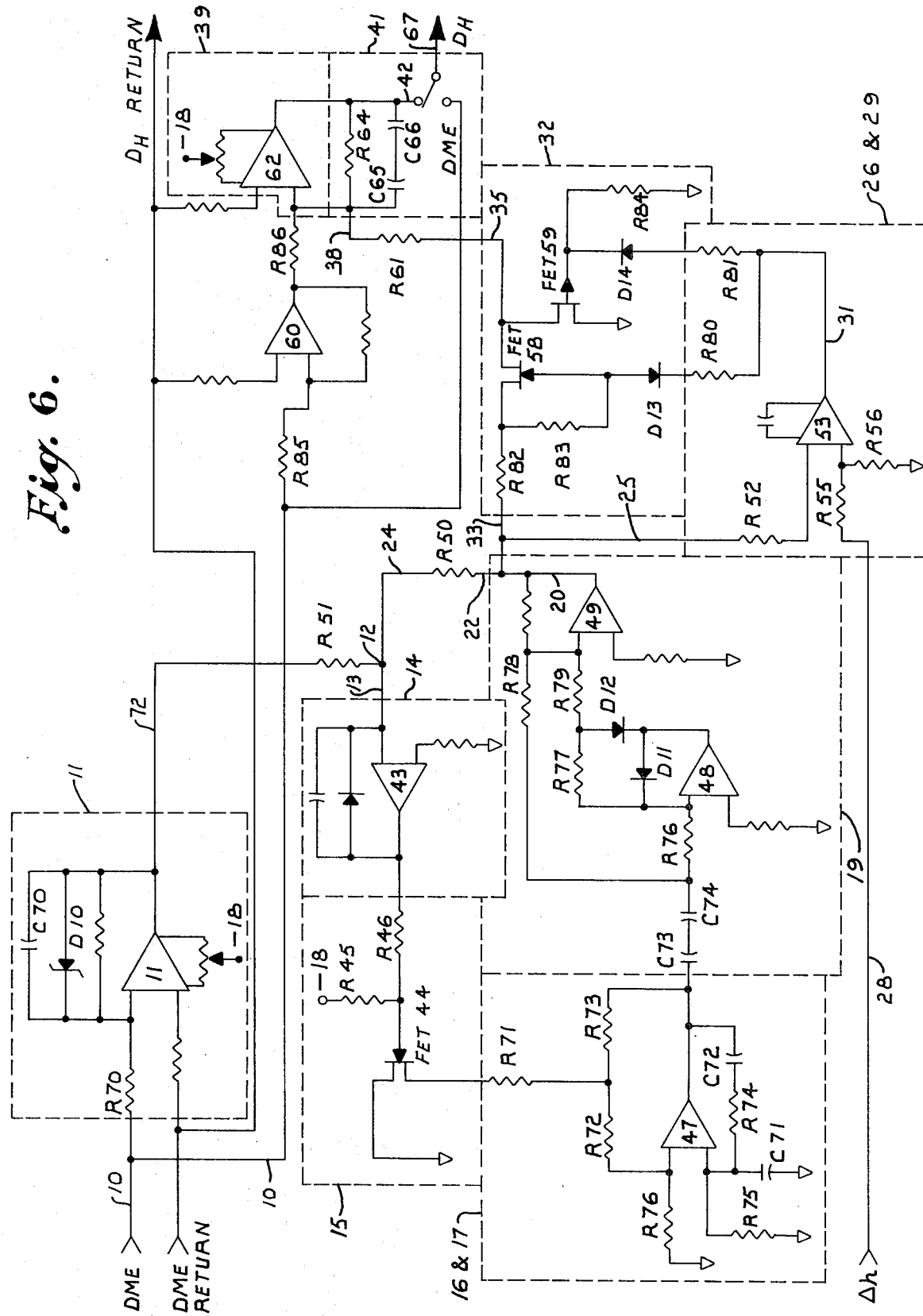
FIG. 6 is a schematic diagram of the subject invention.

In FIG. 1 an aircraft 1 is shown approaching a ground based VORTAC radio station 2 at an elevation $h$ above ground level. The aircraft is at an actual distance $DME_r$ from the VORTAC, as measured by its DME system. This distance is known as slant range, and it forms the hypotenuse of the trianlge shown. The actual horizontal distance between the aircraft and the VORTAC is depicted as $Dh$.

It is apparent that $DME_r$ must always exceed $D_h$, and a correction term equal to $DME_r - D_h$ will necessarily result. From FIG. 1 it is seen that $D_h$ equals $DME_r \cos \theta_a$, so that the correction term equals $DME_r - DME_r \cos \theta_a$, or $DME_r(1 - \cos \theta_a)$. This latter quantity corresponds to an integral defined as $$\int_o^{\theta_a} DME_r \sin \theta d\theta.$$

Later described circuitry generates a sine wave as shown in FIG. 2 having an equation $kDME_r \sin \theta$ and a consequent peak value of $kDME_r$, where $k$ is an arbitrary constant. The quantity $$\int_o^{\theta_a} DME_r \sin \theta d\theta = DME_r (1 - \cos \theta_a)$$

is shown in FIG. 2 as shaded area 4. Averaging this term over the entire period $(0 - 2\pi)$ yields $1/2\pi$ DME $(1 - \cos \theta_a)$. A gain of $2\pi$ is therefore needed to provide the proper correction term scale factor. In order to reduce this gain requirement by a factor of four, the area of the four shaded segments in FIG. 4 may be computed and averaged over the same period. Before this can be done, the waveform of FIG. 2 must be converted to the waveform 6 shown in FIG. 3A by an absolute value circuit discussed, infra. A blanking circuit, infra, utilizes pulses 9 (FIG. 3B) to generate a waveform 8 (FIG. 4), which when averaged and appropriately scaled equals the desired slant range correction term and which may be subtracted from $DME_r$ to yield the aircraft-to-VORTAC horizontal distance.

FIG. 5 is a block diagram of the slant range correction circuit. Slant range distance, as measured by the DME equipment in the aircraft, is inputted to the circuit on wire 10, where it is delivered to amplifier 11, as well as subsequent circuitry. The gain of amplifier 11 is arbitrary and, in the preferred embodiment, a gain of 5 has been selected.

The output of amplifier 11 is fed into a conventional summing junction 12, where an error signal is generated by the subtraction of the output of amplifier 11 and signals to be described later appearing on line 24. This error signal is delivered via line 13 to integrator 14 where it is continuously integrated, and delivered to the gate of a field effect transistor, identified as block 15. The output of the FET 15 controls the damping characteristics of a wien bridge oscillator, comprising blocks 16 and 17. The output of block 17 on wire 18 includes a sine wave, the amplitude of which continues to change as long as an error signal is present on line 13 at the output of the summing junction 12. The oscillator frequency is set to an arbitrary value in the order of 100 hz. The sinusoidal wien bridge oscillator output is delivered to an absolute value circuit 19 via line 18 with the output of the absolute value circuit 19 resembling a full-wave rectified sine wave.

This latter signal is delivered via lines 20, 21 and 22 to block 23, which resistively couples same via line 24 to summing junction 12. This feedback loop, thus completed, controls the damping of the wien bridge oscillator and insures that the magnitude of the sine wave generated thereby is proportional to the DME slant range distance. The output of summing junction 12 will go to zero when the desired proportional relationship $k$, between the wien bridge-generated sine wave and the DME slant range distance, has been achieved.

Altitude information derived from aircraft instrumentation is inputted to the circuit along line 28 and delivered to block 29, which resistively couples same to comparator 26. Also delivered to comparator 26 is the output of the absolute value circuit 19 appearing along lines 20, 21 and 25. Comparator circuit 26 will generate a square wave output and deliver same, via line 31, to blanking switch 32. The comparator compares the amplitude of the absolute value sine wave on line 25 to the variable DC voltage on line 27 which is representative of the aircraft's elevation above the ground.

A pulse signal (9) is generated whenever the signal on line 25 is greater than or equal to the signal on line 27. The square wave signal 9 triggers the blanking switch 32, effectively grounding the output of absolute value circuit 19 when the square wave is "on." The resultant blanking switch output appears on line 35 and is identified in FIG. 4 as waveform 8.

In FIG. 4 the relationship between the square wave output 9 of comparator 26 and the output 6 of absolute value circuit 19 is shown. At this point a signal corresponding to $kDME_r$ sine $\theta$ has been achieved, with the constant $k$ being a function of the gains being applied thereto from the various amplifying circuits.

The purpose of gain block 37 is to scale the average DC value of the signal appearing on line 35 to a level appropriate to sum with the DME slant range signal appearing on line 10. Since the average DC value of the signal is proportional to the integral of this signal (from $0°$ to $\theta_a°$, integration of this signal can be avoided by appropriate choice of scaling constants in the DC averaging process.

The DC level of the signal appearing on line 38 is equivalent to the desired correction term discussed earlier. At summing junction 39, this signal is subtracted from the DME signal appearing on line 10. The result of the subtraction appears on line 40 and enters filter block 41 wherein high frequency components of the difference signal are removed. The direct current output appearing on line 42 thus corresponds to the horizontal distance from the aircraft to the ground VORTAC station. Accordingly, the information may be displayed to the pilot in an analog form on the face of a meter movement (calibrated in miles) or it may be digitally displayed. The output is suitable for use in autopilot or flight director systems as well.

The circuit schematic is shown in FIG. 6. DME slant range information is again inputted on wire 10, and delivered via resistor 70 to amplifier 11. The output is delivered along line 72 to resistor 51, and from thence to summing junction 12 where it is delivered via line 13 to an integrator circuit comprised of operational amplifier 43 and associated circuitry.

The integrator output is delivered via resistor 46 to field effect transistor 44 and associated circuitry. FET 44 controls the damping of the wien bridge oscillator which is comprised of amplifier 47, capacitors C71 and C72, and resistors R72, R73, R74, R75 and R76. The sinusoidal oscillator output is proportional in magnitude to the DME slant range magnitude which appears on line 10. Damping control is achieved by the interconnection of FET 44 via R71 to the resistive feedback loop around amplifier 47 at the junction of R72 and R73.

The oscillator output is delivered to amplifier 48 via capacitors C73 and C74 and resistor R76. Amplifiers 48 and 49 and associated circuitry comprising diodes D11, D12 and resistors R76, R77, R78 and R79 make up an absolute value circuit corresponding to block 19 in FIG. 5. The absolute value circuit output from amplifier 49 is transmitted via lines 20 and 22 through resistor R50 to summing junction 12. (Block 23 in FIG. 5 corresponds to R50 in FIG. 6).

As previously mentioned, slant range information reaches this point via resistor 51. When exact cancellation occurs at junction 12, the magnitude of the wien bridge oscillator output will remain constant. Otherwise it will either increase or decrease, depending on DME input variations, in such a way as to again produce cancellation at point 12. The magnitude of the sine wave generated is thereby kept proportional to DME slant range value, as discussed earlier.

The output of the absolute value circuit reaches amplifier 53 via line 25 and resistor 52. Amplifier 53 and its associated circuitry forms the comparator circuit identified as block 26 in FIG. 5. Altitude information reaches the comparator circuit via line 28 and resistor 55, which corresponds to block 29 of FIG. 5. The square wave output of the comparator is transmitted on line to circuitry comprising blanking switch 32 in FIG. 5. With reference again to FIG. 6, the blanking switch is comprised of FET's 58 and 59, diodes D13, D14 and resistors R80, R81, R83 and R84. Also delivered to the blanking circuitry is the absolute value signal from amplifier 49 which is delivered via line 33 and resistor 82 to FET 58.

The output from the blanking switch, identified as waveform 8 in FIG. 4, is delivered via line 35 to resistor 61. Resistor 61 in FIG. 6 corresponds to block 37 of FIG. 5 and is operable to appropriately scale the average DC value of waveform 8 (FIG. 4). This signal then reaches subsequent summing circuitry via line 38.

The summing circuit, identified in FIG. 5 by reference numeral 39, is comprised of amplifier 62 and associated circuitry. Also reaching the summing circuit is the DME slant range information which is transmitted through line 10 and resistor R85 to isolation amplifier 60, and from thence through R86 to amplifier 62. In conjunction with amplifier 62, capacitors C65 and C66 and resistor R64 comprise a filter, which corresponds to block 41 of FIG. 5. The desired horizontal distance information will be outputted on line 42, and may be utilized by subsequent avionic systems and devices.

From the foregoing, it will be seen that this invention is one well adapted to attain all the ends and objects herein set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. An avionics data system operable to electrically compute horizontal aircraft-to-VORTAC distance from the input signal parameters of altitude and slant range, said system comprising:
   means for electrically generating a sinusoidal shaped signal having an amplitude corresponding to said slant range,
   means for filtering a portion of said sinusoidal signal corresponding to the present altitude of said avionics system to form a correction term signal, and
   means for subtracting said correction term signal from said slant range input signal parameter to thereby compute horizontal aircraft-to-VORTAC distance.

2. The system as in claim 1 wherein said correction term is equal to slant range minus horizontal distance.

3. Apparatus comprising an avionics data system for the electrical computation of horizontal aircraft-to-VORTAC distance from the input signal parameters corresponding to slant range and altitude, said system having an output and comprising:
   means for generating a sinusoidal signal;
   means for generating a feedback signal;
   means interconnecting both sinusoidal signal and feedback generating means for automatically and continuously controlling the amplitude of said sinusoidal signal with said feedback signal and to produce an absolute value signal of said sinusoidal signal;
   means connected to said two above-mentioned signal generating means for generating a square wave signal having an amplitude and pulse width proportional to said altitude input parameter signal;
   means connected with said square wave generating means and comprising a blanking switch for gating the absolute value signal by said square wave signal thereby generating a gated output;
   means for scaling the average DC value of said gated output, thereby generating a scaled output; and
   means for subtracting said scaled output from said slant range input parameter, thereby generating a difference signal corresponding to horizontal aircraft-to-VORTAC distance.

4. The combination as in claim 3 including means for filtering said difference signal output.

5. The combination as in claim 3 wherein said sinusoidal signal generation means includes an oscillator having variable damping.

6. The combination as in claim 5 wherein said feedback signal is derived from said slant range input signal parameter.

7. The combination as in claim 6 wherein said feedback signal controls said damping of said oscillator, thereby maintaining an oscillator output amplitude proportional to said slant range.

8. A method of computing horizontal aircraft-to-VORTAC distance from altitude and slant range input signal parameters in an avionics system, the method including the steps of:
   generating a sinusoidal shaped signal having an amplitude corresponding to slant range, filtering a portion of said sinusoidal signal corresponding to the present altitude of said avionics system to form a correction term signal; and
   subtracting said correction term signal from said slant range input signal parameter to thereby compute horizontal aircraft-to-VORTAC distance.

9. The method as in claim 8 wherein said correction term generating step includes the further steps of
   generating a sinusoidal signal having an amplitude directly proportional to said slant range input parameter;
   generating a signal corresponding to the absolute value of said sinusoidal signal;
   generating a square wave having a pulse width and amplitude proportional to said altitude and slant range input parameters;
   gating said absolute value signal with said square wave to form a gated output, and
   scaling said gated output.

10. The method as in claim 9 wherein the amplitude of said sinusoidal signal is maintained proportional to slant range input parameter, the method comprising the further steps of:
    generating a difference signal from said slant range input parameter and said absolute value signal;
    generating a feedback control signal; and
    varying the damping of said sinusoidal signal with said feedback control signal.

11. The method as in claim 10 including the step of integrating said difference signal during the generating of said feedback control signal.

* * * * *

UNITED STATES PATENT OFFICE
CERTIFICATE OF CORRECTION

Patent No. 3,863,053          Dated January 28, 1975

Inventor(s) Robert E. Friday

It is certified that error appears in the above-identified patent and that said Letters Patent are hereby corrected as shown below:

Col. 2, line 19 "trianlge" should be --triangle--.

Col. 4, line 44 the numeral --31-- is omitted.

Signed and sealed this 1st day of April 1975.

(SEAL)
Attest:

RUTH C. MASON
Attesting Officer

C. MARSHALL DANN
Commissioner of Patents
and Trademarks